Figure 1:
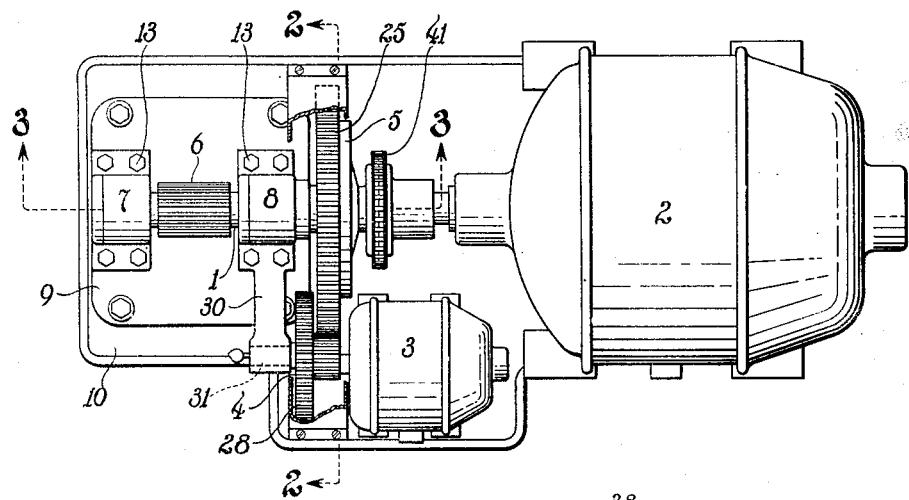

March 20, 1934.  E. H. LAABS  1,951,875

POWER TRANSMISSION MECHANISM

Filed Aug. 6, 1932  2 Sheets-Sheet 1

Inventor
Eric H. Laabs
By Frank T. Hubbard
Attorney

March 20, 1934.   E. H. LAABS   1,951,875
POWER TRANSMISSION MECHANISM
Filed Aug. 6, 1932   2 Sheets-Sheet 2

Inventor
Eric H. Laabs
By Frank H. Hubbard
Attorney

Patented Mar. 20, 1934

1,951,875

UNITED STATES PATENT OFFICE 1,951,875

POWER TRANSMISSION MECHANISM

Eric H. Laabs, Milwaukee, Wis., assignor to Cutler-Hammer, Inc., Milwaukee, Wis., a corporation of Delaware Application August 6, 1932, Serial No. 627,731

4 Claims. (Cl. 74—7)

This invention relates to power transmission mechanisms, and while not limited thereto is particularly applicable to drives for machines such as large newspaper presses and paper calendars.

Such machines are usually provided with what is commonly known as a two-motor drive, a large motor being employed for driving the machine at a relatively high running speed, and a small motor being employed to drive the machine at a slow speed such as is required for starting and threading. In such drives the large motor is usually coupled directly to a main drive shaft of the machine and the small motor is usually arranged to drive said shaft through the medium of an overrunning clutch and reduction gearing including a large low speed gear journaled upon said shaft and arranged to drive the same through the medium of said clutch. With the parts arranged in this manner the drive shaft of the machine rotates within the bearing of the low speed gear upon operation of the machine by the large motor, and in practice it has been found that the bearing of the low speed gear is thus subjected to excessive wear.

The present invention has among its objects to provide an improved two-motor drive for machines such as large newspaper presses and paper calendars which will overcome the aforementioned objection.

Another object is to provide a drive of the aforesaid character wherein the driving connections between the main drive shaft of the machine and the small motor are arranged so as to minimize forces tending to effect bending of said shaft when the same is driven by the small motor.

Another object is to provide a drive of the aforesaid character having its parts arranged to facilitate assembly or removal of the main shaft and the driving parts associated therewith without disturbing the mounting of the motors.

Various other objects and advantages of the invention will hereinafter appear.

The accompanying drawings illustrate an embodiment of the invention which will now be described, it being understood that the embodiment illustrated is susceptible of modification without departing from the spirit and scope of the appended claims.

Figure 2:
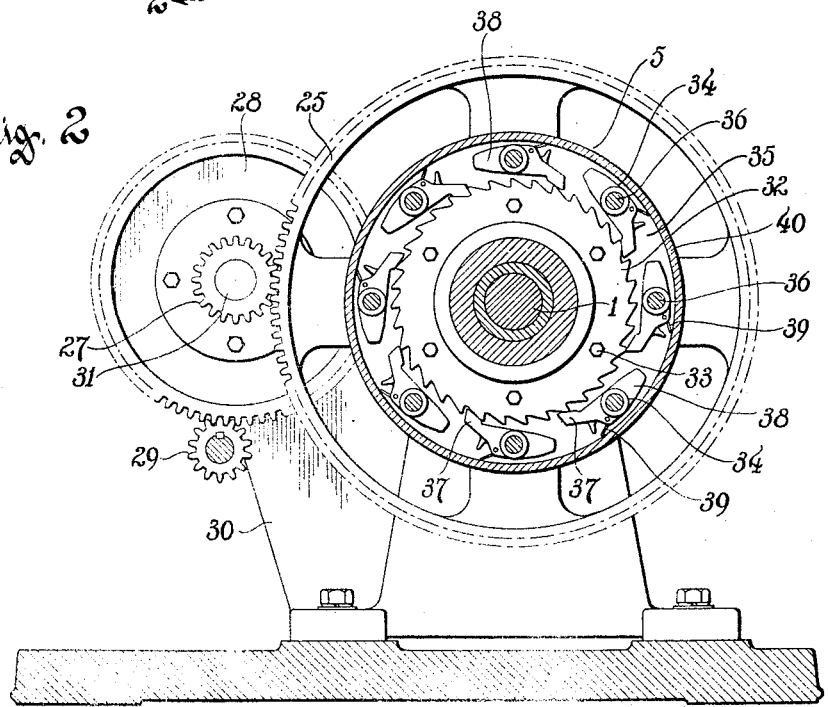
Figure 3:
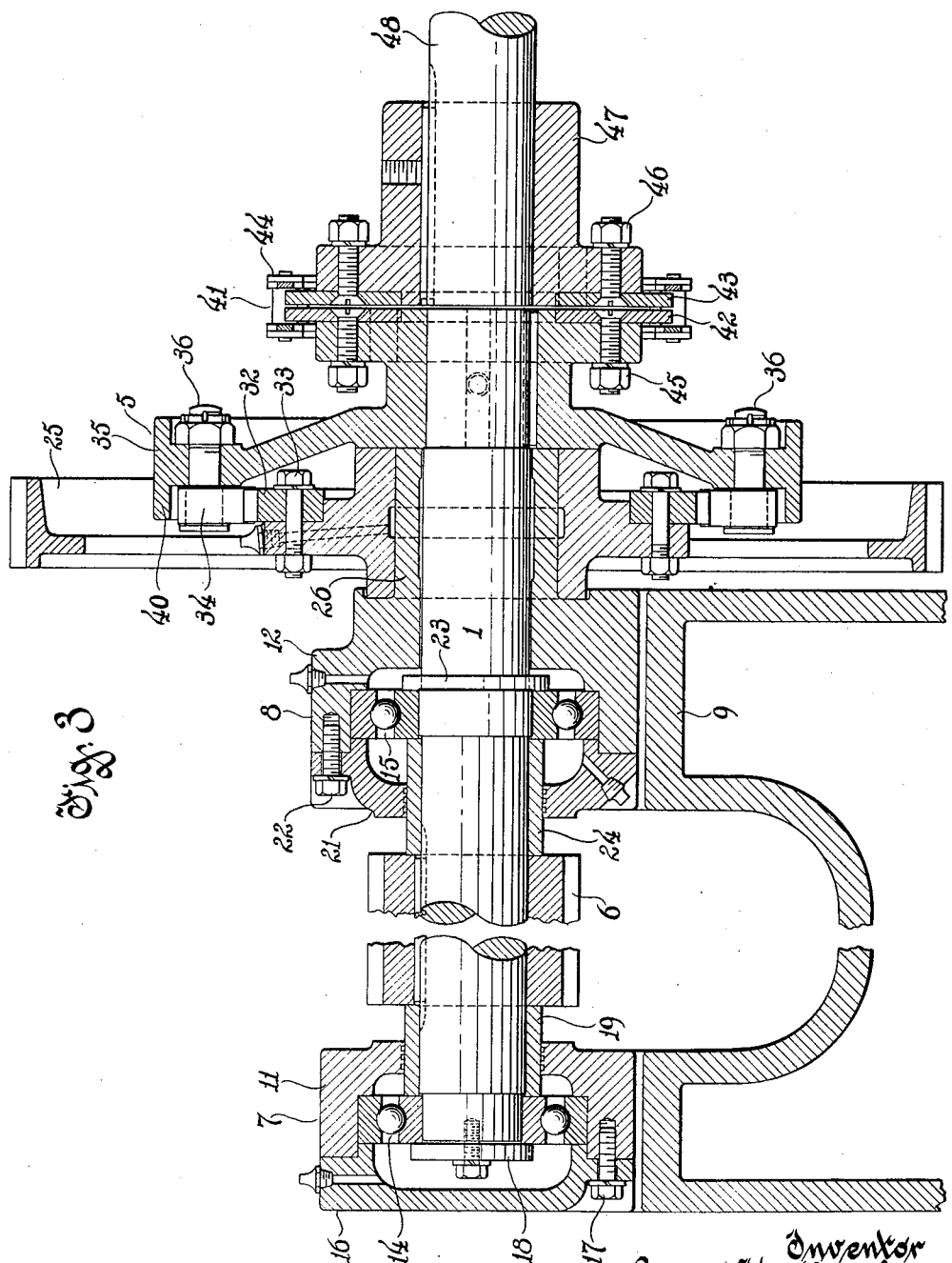

In the drawings,

Figure 1 is a plan view of a two-motor drive constructed in accordance with the invention, and Figs. 2 and 3 are sectional views on lines 2—2 and 3—3, respectively, of Fig. 1.

Referring to Fig. 1, the same illustrates a main drive shaft 1, a large motor 2 coupled directly to said shaft and a small motor 3 arranged to drive said shaft through the medium of reduction gearing 4, and an overrunning clutch 5. Shaft 1 has a pinion 6 keyed thereto for driving a machine such as a large newspaper press or paper calendar, and said shaft is supported on opposite sides of said pinion within journal boxes 7 and 8 mounted upon a pedestal 9. Pedestal 9 is bolted to a bed plate 10 upon which the motors 2 and 3 are also mounted.

Journal boxes 7 and 8 are provided with casing members 11 and 12, respectively, which are secured to pedestal 9 by screws 13, and shaft 1 is supported within casing member 11 by an anti-friction bearing 14, and within casing member 12 by an anti-friction bearing 15. The outer race of ball bearing 14 is held in place within a bored opening in casing member 11 by a cap member 16 which is fixed to said casing member by screws 17, and the inner race of said bearing is mounted upon shaft 1 between a plate 18 fixed to the end of said shaft and a bushing 19 located between said inner race and pinion 6. The outer race of ball bearing 15 is held within a bored opening in casing member 12 by an annular cap member 21 which is fixed to said casing member by screws 22 and the inner race of said bearing is mounted upon shaft 1 between a projection 23 on said shaft and a bushing 24 located between said inner race and the pinion 6. Each of the journal boxes 7 and 8 is provided with means for supplying a lubricant to its associated bearing, and in order to prevent leakage of the lubricant casing member 11 is provided with a grooved opening closely surrounding the bushing 19 and cap member 21 is provided with a grooved opening closely surrounding the bushing 24.

The reduction gearing 4 includes a large diameter spur gear 25 arranged concentric with respect to the axis of shaft 1 and rotatably mounted upon a sleeve extension 26 on the right hand end of casing member 12. Gear 25 meshes with a pinion 27 and said pinion has a driving gear 28 fixed thereto which meshes with a pinion 29 fixed to the shaft of the small motor 3. As shown in Figs. 1 and 2 pedestal 9 is provided with a projecting arm 30 which carries a shaft 31 upon which the pinion 27 and gear 28 are rotatably mounted.

The overrunning clutch 5 provides a driving connection between gear 25 and shaft 1 when said gear is driven in one direction with respect to said shaft by the small motor 3. Said clutch may be of the type disclosed in my Patent No. 1,757,593, of June 24, 1930, and includes a ratchet wheel 32 fixed to the hub portion of gear 25 by bolts 33, and a plurality of pawls 34 carried by a wheel 35 which is keyed to shaft 1 and is provided with a faced surface which abuts the hub portion of gear 25 to hold said gear in position upon the sleeve extension 26. The pawls 34 are pivotally mounted upon pins 36 fixed to wheel 35, and as shown in Fig. 2 each of said pawls is provided with a hub portion having a projecting tooth engaging part 37 on one side thereof and a counterweight portion 38 on the opposite side thereof. Also each of the pawls 34 has a spring 39 associated therewith, said springs being arranged to engage a projecting rim portion 40 on wheel 35 and serving to bias their associated pawls in a direction to effect engagement of the tooth engaging parts 37 with the ratchet wheel 32. The pawls 34 are normally held by their associated springs in a position to provide a drive between gear 25 and shaft 1 for operation of said shaft at a relatively low speed by the small motor 3. However, upon acceleration of said shaft to a given critical overrunning speed by the large motor 2 the pawls 34 move out of engagement with the ratchet wheel 32 under the action of centrifugal force and upon deceleration of said shaft to a given critical speed said pawls are adapted to reengage said ratchet wheel.

Wheel 35 is coupled to the shaft 48 of the large motor 2 by a suitable coupling, as for example a chain type coupling 41 illustrated in the drawings. Coupling 41 includes adjacent annular disks 42 and 43, said disks having notches in the peripheries thereof for receiving the cross links of an encircling chain 44. Disk 42 is secured to a projecting flange on wheel 35 by bolts 45 and the disk 43 is secured by bolts 46 to a projecting flange on a member 47 which is keyed to the shaft 48 of the large motor 2.

In connection with the foregoing it should be noted that numerous advantages are obtained by arranging the parts of the drive in the manner above described. For example, by removing the chain 44 of the coupling 41 and removing the securing bolts 13 associated with the journal boxes 7 and 8, the drive shaft 1 and the parts mounted thereon can be removed and replaced as a unit without disturbing the mounting of the large motor 2 and small motor 3. Also it should be noted that during operation of the drive at running speeds by the large motor 2, gear 25 is stationary upon the sleeve extension 26 of casing member 12, to prevent wear of the bearing portion of said gear.

What I claim as new and desire to secure by Letters Patent is:

1. In a power transmission mechanism, the combination with a main motor and an auxiliary motor, of a shaft to be driven by either of said motors, said shaft having a driving pinion fixed thereto, bearings for supporting said shaft on opposite sides of said pinion, one of said bearings having an integral sleeve extension thereon which surrounds said shaft, and driving connections between said auxiliary motor and said shaft including a slow speed gear journaled upon the sleeve extension of said bearing, and an overrunning clutch providing a driving connection between said shaft and said slow speed gear.

2. In a power transmission mechanism, the combination with main and auxiliary driving motors, of a shaft to be driven by either of said motors, said shaft having a driving pinion fixed thereto, journal boxes for said shaft located on opposite sides of said driving pinion, and each having an anti-friction bearing associated therewith for supporting said shaft, one of said journal boxes having an integral sleeve extension on the side thereof opposite said pinion which surrounds said shaft, reduction gearing associated with said auxiliary motor including a low speed gear rotatably mounted upon said sleeve extension and an overrunning clutch providing a driving connection between said shaft and said low speed gear.

3. In a power transmission mechanism, the combination with a main motor and an auxiliary motor, of a shaft to be driven by either of said motors, a pedestal, a journal box mounted upon said shaft and removably secured to said pedestal, said journal box having an integral sleeve extension on one end thereof surrounding said shaft, a releasable coupling between said shaft and said main motor, and driving connections between said shaft and said auxiliary motor including a slow speed gear rotatably mounted upon said sleeve extension, and an overrunning clutch between said gear and said shaft, said shaft and said journal box together with said slow speed gear and said overrunning clutch being removable from said pedestal as a unit without axial displacement when said shaft is uncoupled from said main motor.

4. In a power transmission mechanism, the combination with a main motor and an auxiliary motor, of a shaft to be driven by either of said motors and having a driving pinion fixed thereto, a support, journal boxes mounted upon said shaft upon opposite sides of said pinion and removably secured to said support, one of said journal boxes having an integral sleeve extension thereon surrounding said shaft and arranged on the side opposite said pinion, a releasable coupling between said main motor and said shaft, and a driving mechanism between said shaft and said auxiliary motor including a slow speed gear rotatably mounted upon said sleeve extension and an overrunning clutch between said gear and said shaft, said shaft and its associated journal boxes together with said slow speed gear and said overrunning clutch being removable from said support as a unit without axial displacement when said shaft is uncoupled from said main motor.

ERIC H. LAABS.